United States Patent Office 3,493,498
Patented Feb. 3, 1970

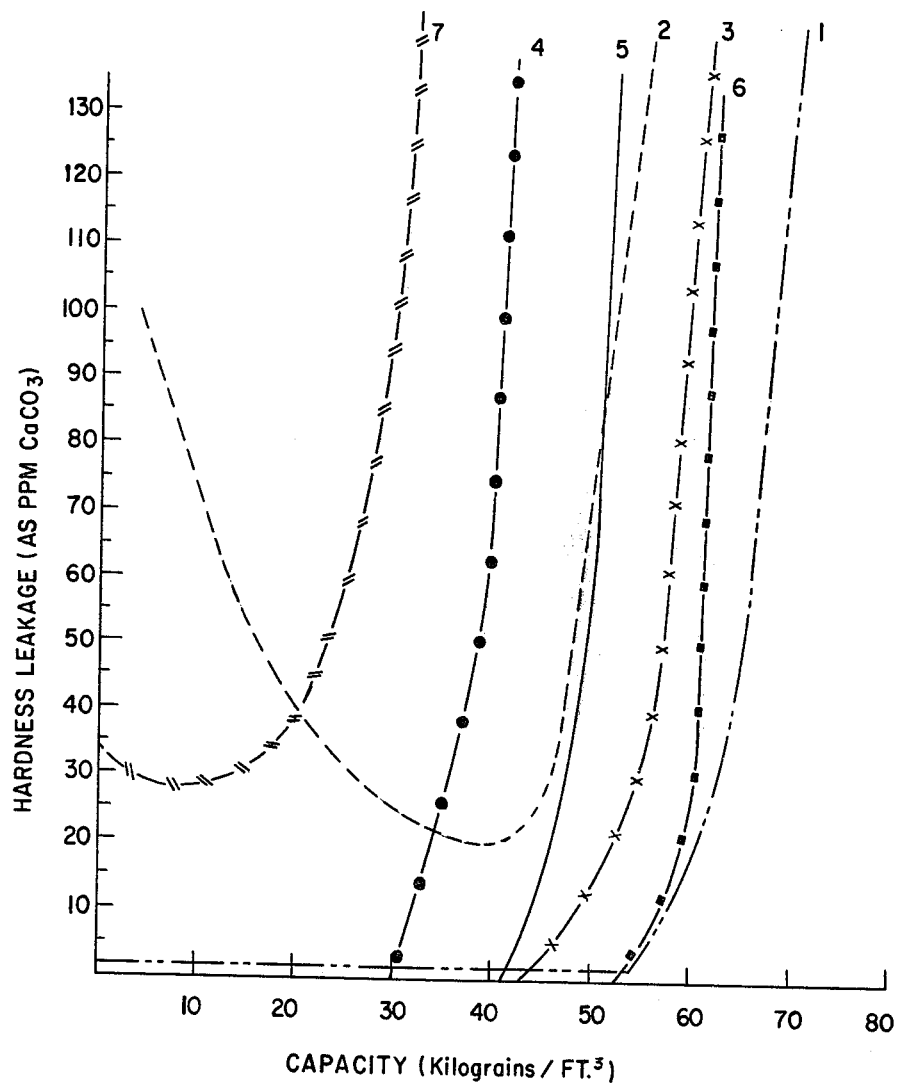

3,493,498
ION-EXCHANGE PROCESS
Irving M. Abrams, Redwood City, Calif., and Chester S. Parks, Holmdel, N.J., assignors to Diamond Shamrock Corporation, a corporation of Delaware
Filed Sept. 11, 1967, Ser. No. 666,889
Int. Cl. B01d 15/04
U.S. Cl. 210—32                                5 Claims

ABSTRACT OF THE DISCLOSURE

Hardness is removed from water by contacting said water with a weak-acid cation-exchange resin in the alkali metal or ammonium form. Regeneration of the resin when spent is effected by first eluting the hardness ions from the resin by contacting said resin with an aqueous acid followed by conversion of the resin to the alkali metal or ammonium form by contact with an aqueous solution of an alkali metal or ammonium carbonate or bicarbonate or ammonium hydroxide. By this method hardness may be completely removed from even highly saline waters.

BACKGROUND OF THE INVENTION

Throughout the world, there are many waters with total dissolved solids ranging from 100 to 300,000 parts per million (p.p.m.). Sea water contains approximately 30,000 p.p.m. total dissolved solids, most of which is sodium chloride, whereas brackish waters contain about 1,000 to 20,000 p.p.m. of salts. Most of these highly saline waters contain relatively minor concentrations of hardness ions, but they are often objectionable for industrial applications. For example, when sea water is distilled, the alkaline earth elements form scale deposits in the equipment, resulting in a rapid decline in operating efficiency. The adverse effects of water hardness in many industrial operations are well known.

Hardness can be removed from water by chemical precipitation or by ion-exchange. Both methods are used industrially. In particular, the ion-exchange method which conventionally has been used consists of using a strong-acid cation exchanger in the sodium form. The resin (or zeolite) is regenerated with a concentrated salt solution and rinsed free of brine. After regeneration, the hardness ions in the feed water are exchanged in the column for sodium. This conventional ion-exchange softening process is illustrated by the following reaction:

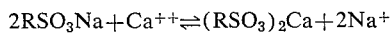

$$2RSO_3Na + Ca^{++} \rightleftharpoons (RSO_3)_2Ca + 2Na^+$$

This is a reversible reaction. Thus, if the influent solution contains a high concentration of sodium ions, the reaction can be driven to the left and the net result is a high "leakage" of calcium ions through the column of ion-exchange material. Conventional water softeners effect a partial removal of multivalent cations from waters high in sodium, but complete removal is not possible when the ration of monovalent cations to multivalent cations is very high, particularly when total dissolved solids are in excess of 5,000 p.p.m.

Multivalent cations can also be selectively removed by means of a weak-acid cation-exchange resin in the hydrogen form. Such resins are not regenerated by sodium chloride, but they are easily regenerated with mineral acids. However, when a hard water is softened by the acid form of a weak-acid cation-exchange resin, the resulting effluent is usually acid and therefore highly corrosive.

Weak-acid cation-exchange resins are used in the hydrogen cycle for the simultaneous removal of hardness and alkalinity. This use of the weak-acid resin has been especially popular in Europe. In most cases, however, the primary purpose is alkalinity reduction, softening being a secondary benefit. In hydrogen cycle operations, the results depend on water composition. In order to obtain good capacity and low leakage, the influent water must contain a high proportion of its total anions as alkalinity, e.g., bicarbonate, carbonate or hydroxide. In most runs, the effluent pH runs low, at least initially. Indeed, the weak-acid cation exchangers are generally used to remove temporary hardness (calcium and magnesium associated with bicarbonate or carbonate alkalinity) and are often followed by a conventional salt-regenerated softener to remove permanent hardness (calcium and magnesium associated with chlorides and sulfates).

STATEMENT OF THE INVENTION

It is an object of the present invention to provide an improved process for the removal of hardness from water.

It is a further object of the present invention to provide a process for the complete removal of hardness from water regardless of the salinity of said water.

It is still a further object of the present invention to provide a process whereby hardness can be completely removed from water without affecting the pH thereof.

These and other objects and advantages of the present invention will become apparent to those skilled in the art from the description that follows.

It has now been found that hardness may be completely removed from water without substantially affecting the pH thereof by contacting said water with a weak-acid cation-exchange resin wherein the cation is selected from the group consisting of alkali metal and ammonium cations. It has further been found that when said weak-acid cation-exchange resin is exhausted, it may be regenerated by first eluting the hardness ions therefrom with an excess of an aqueous acid, rinsing with water to remove the excess acid, converting the eluted resin by contacting it with an aqueous solution of a converting agent selected from the group consisting of alkali metal and ammonium carbonates and bicarbonates and ammonium hydroxide, and finally, rinsing the converted resin with water to remove any excess converting agent.

DESCRIPTION OF THE DRAWING

The figure is a graphical representation of the effectiveness of various embodiments of the present invention as compared to certain prior ion-exchange processes.

DESCRIPTION OF THE PREFERRED EMBODIMENTS

The practice of the present invention affords many advantages over prior art practices for reducing the hardness of water. One of the primary advantages, of course, is that the hardness ions are completely removed from water treated with weak-acid cation-exchange resins in the alkali metal or ammonium form. That is to say that no hardness ions are detectable within the limits of sensitivity of the analytical techniques commonly used to evaluate hardness. This is opposed, as is mentioned above, to the use of strong-acid cation-exchange resins wherein the ion-exchange process is reversible thereby leading to leakage through the column of hardness ions. Furthermore, the use of the weak-acid cation-exchange resins in the hydrogen form to treat water has had the disadvantage that, whereas hardness ions are sometimes completely removed from the waters treated with said resins, they are replaced with hydrogen ions which, of course, result in a lowering of the pH of the water and consequent corrosion problems. As mentioned above, this latter technique has seen little use in the treatment of waters to remove hardness except in the specialized case where the waters treated are alkaline in nature whereby the treatment serves to remove both the alkalinity and the hardness.

A further advantage of the present invention is that its successful practice is not dependent upon either the total dissolved solids present in the waters to be treated nor on the ratio of the total dissolved solids to the total hardness. Thus, the weak-acid cation-exchange resins in the alkali metal or ammonium form may be used to completely remove the hardness from waters having a total dissolved solids content even greatly in excess of 5,000 p.p.m. without danger of leakage of the hardness ions from the resin bed. Furthermore, hardness can be equally well removed from waters containing high or low alkalinity.

It is also to be noted that the weak-acid cation-exchange resins exhibit the ability to remove a greater quantity of hardness per cubic foot of resin than either the strong-acid cation-exchange resins which have previously been used to soften water or the chelating resins which have been said to be effective in removing traces of hardness from water. For example, while a typical weak-acid cation-exchange resin may have a capacity of 60 kilograins of cation (expressed as calcium carbonate) per cubic foot, a strong-acid cation-exchange resin will generally have a capacity on the order of 30 kilograins of cation per cubic foot and a chelating resin a capacity on the order of from 5 to 10 kilograins of cation per cubic foot. In addition to this great advantage in capacity over the chelating resins, it is also to be noted that the cost of the weak-acid cation-exchange resins is considerably lower, thereby lowering the initial investment in establishing an ion-exchange process.

The weak-acid cation-exchange resins which are particularly useful in the practice of this invention are those which contain carboxylic acid groups. These resins can conveniently be obtained by the copolymerization of compounds such as acrylic acid, methacrylic acid, acrylic esters, methacrylic esters, acrylonitrile or methacrylonitrile, and other unsaturated acrylates or nitriles with appropriate crosslinking agents such as divinylbenzene. If the resins are made directly from the acid forms of the above compounds they can, of course, be used without further treatment except for conversion to the alkali metal or ammonium form thereof. If the resins are formed, however, from the polymerization of compounds containing ester or nitrile groups, hydrolysis to the corresponding acid must be effected prior to the conversion to the appropriate alkali metal or ammonium form. Further illustrations of the resins useful in the practice of the present invention and of methods for their preparation may be found by reference to U.S. Patents Nos. 2,340,111; 2,471,818; 2,597,437; 2,885,371 and 2,963,453. In addition to the above-mentioned ion-exchange resins, other weak-acid resins may be used. These resins may include those containing phosphonous, phosphonic, phosphinic or phosphoric acid groups and those resins which are made from phenol-formaldehyde condensates which also contain carboxylic acid groupings. The ion-exchange resins preferred at this time are those which contain either acrylic or methacrylic acid functional groups.

As has been pointed out hereinabove, it is the teaching of the present invention that the weak-acid cation-exchange resins are used in either their alkali metal or ammonium forms. By the use of the term "alkali metal" it is, of course, intended to refer to the sodium, potassium, and lithium forms of the resins, with the sodium form being preferred because of the ready availability and low cost of the chemicals required for its formation, e.g., sodium carbonate.

In order to obtain the weak-acid cation-exchange resins in their alkali metal or ammonium forms, it is usually necessary to treat the hydrogen form of the resin with an appropriate converting agent. Converting agents that are useful for this purpose include the alkali metal and ammonium carbonates and bicarbonates along with ammonium hydroxide. Again, by the use of the term "alkali metal," it is intended to refer primarily to the sodium, potassium and lithium carbonates and bicarbonates. It has surprisingly been found that the alkali metal hydroxides, especially sodium hydroxide, are undesirable in the practice of this invention for the conversion of the resin to its alkali metal form. The use of sodium hydroxide or any alkali metal hydroxide to effect this conversion results in a resin from which some hardness leakage will be evidenced when the resin is subsequently used to remove the hardness from water. Presumably, this is due to the presence in the ion-exchange resin of residual alkali which leads to precipitation within the resin bed of compounds such as calcium and magnesium hydroxide which subsequently result in the hardness leakage from the resin.

The actual method of contact by which the hardness ions are to be removed from the water with the weak-acid cation-exchange resin, is not critical to the practice of the present invention. Generally speaking, a suitably sized bed of the resin may be established by any known method to suit the extent and nature of the operation involved. The water to be treated is then passed through the established resin bed at a rate of from 0.1 to 10 gallons per minute per cubic foot of resin at a temperature within the range from 0 to 100° C. Even higher temperatures may of course be used, if the exchange process is carried out under pressure. Again, these parameters are not critical and serve only to illustrate the practice of the invention. Generally speaking, however, it will be found that the capacity of the resin to remove hardness ions increases with increasing temperature and decreases with increasing flow-rates.

Obviously, when its capacity to exchange alkali metal or ammonium ions for the hardness ions in the water has been met, it is desirable in the interest of economical operation, to regenerate the weak-acid cation-exchange resin in order that it may be reused. As is mentioned hereinabove, the regeneration of the weak-acid cation-exchange resins of the present invention is essentially a two-step process.

In the first step, the hardness ions are eluted from the resin by the action thereon of an excess of an aqueous acid. Many acids are useful for this purpose, sulfuric and hydrochloric acids being preferred because of their economy and ready availability. The hardness ions are relatively easily eluted from the exhausted resin by treatment with about 110 to 120 percent of the stoichiometric amount of acid required to exchange with the hardness present in the resin. The quantity of acid to be used is generally expressed in terms of pounds of acid per cubic foot of resin. In the case, for example, of sulfuric acid, an amount of acid within the range of from 4 to 15 pounds per cubic foot of resin has been found effective. With hydrochloric acid, from 2 to 10 pounds of acid per cubic foot of resin is generally sufficient. The acid is conveniently used in the form of a dilute aqueous solution containing from 0.1 to 5 percent sulfuric acid or from 1 to 10 percent hydrochloric acid. With sulfuric acid the lower concentrations are preferred in order to avoid any problems which may occur with the precipitation of calcium sulfate onto the resin from more concentrated solutions. With hydrochloric acid, since the precipitation problem is not present, more concentrated solutions may be used. In operation, the acid solution is passed through the exhausted resin at a rate of from about 0.5 to 4 gallons per minute per cubic foot of resin.

Following elution of the hardness ions with an excess of acid as explained above, the resin should then be treated with water in order to rinse the excess acid from the resin bed. A quantity of water within the range of from 10 to 15 gallons per cubic foot of resin, applied at a flow-rate of from 2 to 3 gallons per minute per cubic foot of resin, is generally satisfactory.

Since, following the above, the resin is now in the hydrogen form, it is necessary, in order to complete the regeneration process, to convert the resin from said hydrogen form into the alkali metal or ammonium form. This is readily accomplished by treating the resin with a converting agent which is an aqueous solution of an alkali metal or ammonium carbonate or bicarbonate or ammonium hydroxide. Especially preferred at this time are sodium carbonate, ammonium carbonate and ammonium hydroxide. The amount of converting agent employed to convert from the hydrogen to the alkali metal or ammonium form of the cation-exchange resin will determine the capacity of the resin for removing hardness from water and it is generally found that a range of from 50 to 60 percent in excess of the theoretical quantity of converting agent is satisfactory. While greater quantities of the converting agent will give higher capacities, the efficiency of the conversion step decreases with increasing quantities of converting agent. When using sodium carbonate as the converting agent, amounts within the range of from 5 to 20 pounds of sodium carbonate per cubic foot of resin are suitable, 8–16 pounds per cubic foot being preferred. Like quantities of ammonium carbonate are useful whereas, if ammonium hydroxide is to be used as the converting agent, amounts within the range of from 1 to 5 pounds per cubic foot of resin are suitable. These converting agents are applied in the form of an aqueous solution thereof with, in the case of sodium and ammonium carbonate for example, from 1 to 10 percent by weight of the converting agent being a satisfactory quantity. With ammonium hydroxide, solution concentration is not particularly important, it being possible to use solutions containing from 0.1–28 percent by weight of ammonia. Concentrations on the order of from 1 to 5% are preferred, however, in practice.

It will be obvious to one skilled in the art that when using alkali metal or ammonium carbonate as the converting agent, quantities of carbon dioxide gas will be evolved when the agent is contacted with the hydrogen form of the weak-acid cation-exchange resin. Problems due to this bubble formation and the consequent channelling within the resin bed can be avoided by using the converting agent in low concentrations and at high flow rates in a system wherein pressure may be applied to the aqueous solution of the converting agent as it passes through the resin bed. In general, with the converting agents of the present invention, flow-rates within the range of from 0.5 to 4 gallons per minute per cubic foot of resin are practical.

Upon completion of the above steps, the resin is now ready to be used once again for removing hardness from water following a final step of rinsing to remove the excess of converting agent from the resin, once again using water.

It will be understood by those skilled in the art that the practice of the present invention will find many uses among which are, for example, the pretreatment of brackish and sea waters prior to distillation in order to prevent scaling of equipment, the treatment of brackish waters used to produce steam in secondary oil recovery and the treatment of brines used in producing chlorine and caustic soda. Furthermore, because of the affinity of the weak-acid cation-exchange resins for divalent metal ions, these resins may be used to remove and recover heavy metals from industrial waste solutions.

Since, as has been mentioned hereinabove, the weak-acid cation-exchange resins of the present invention are useful for removing hardness from water regardless of the salinity or alkalinity thereof or the ratio of total dissolved solids to total hardness, these resins may be used as a primary treatment, that is directly on saline waters containing even in excess of 5,000 p.p.m. total dissolved solids. However, from an economic point of view, since the use of the resins of the present invention requires a two-step regeneration process and since this process is inherently somewhat more expensive than a process involving a resin requiring only a one-step regeneration with salt or acid, it may be desirable to use the weak-acid cation-exchange resin in secondary or polishing capacities. That is to say that, it may be desirable to first pass waters having a high total dissolved solids content through a zeolite or strong-acid cation-exchange resin in order to remove the majority of the divalent ions present. The pretreated water may then be contacted with the weak-acid cation-exchange resin in order to effect a complete removal of the remaining hardness ions. In this manner, the resins of the present invention act as an efficient and economical polishing step.

In order that those skilled in the art may more readily understand the invention, the following specific examples are afforded.

EXAMPLE 1

In order to illustrate the practice of the present invention, seven resin beds are established in glass tubes having a ⅝ inch inside diameter using 30 milliliters of ion-exchange resin. This gives a bed depth of between 5 and 6½ inches. In each instance, the water to be treated is passed through the column at a rate of about 3.0 gallons per minute per cubic foot of resin. Other conditions are as set forth in Table 1, including the total hardness and total dissolved solids contents of the influent waters.

TABLE I

| Run | Resin | # Acid [b] ft.$^3$ resin/ | Converting agent | # Agent/ ft.$^3$ resin | Total dissolved solids (p.p.m.) | Total hardness (p.p.m.) |
|---|---|---|---|---|---|---|
| 1 | ES-80 [a] | 14 | 4% NaOH | 11 | 3,240 | 380 |
| 2 | ES-80 | 14 | 4% NaOH | 11 | 24,660 | 1,760 |
| 3 | ES-80 | 14 | 4% Na$_2$CO$_3$ | 16 | 3,240 | 380 |
| 4 | ES-80 | 7 | 4% Na$_2$CO$_3$ | 8 | 2,930 | 408 |
| 5 | ES-80 | 14 | 4% Na$_2$CO$_3$ | 16 | 24,660 | 1,760 |
| 6 | ES-80 | 14 | 1% NH$_4$OH | 17 | 2,930 | 408 |
| 7 | C-20 [c] | [d] 20 | | | 2,930 | 408 |

[a] Duolite ES-80, trademark of Diamond Shamrock Corp. for an acrylate-type, weak-acid cation-exchange resin.
[b] Dosage of 66° Bé H$_2$SO$_4$, applied as a 1% solution.
[c] Duolite C-20, trademark of Diamond Shamrock Corp. for polystyrene-type, strong-acid cation-exchange resin.
[d] Strong-acid cation-exchange resin regenerated in one step with 20 pounds of NaCl/cubic foot of resin.

FIGURE 1 sets forth in graphic form the efficiency of each of the resin beds in removing the hardness from the water. In this graph the total hardness of the effluent waters from the resin beds is plotted versus the capacity of these resins to remove said hardness. From an examination of FIGURE 1, it will be seen that Runs 3–6 are successful in completely removing the hardness from the influent waters up to the indicated throughput, at which time a sharp breakthrough occurs. In Runs 1 and 2 a leakage of hardness occurs throughout the entire service run, thereby showing that sodium hydroxide is not entirely effective as a converting agent in the practice of the present invention. In Run 7 it is seen that the use of a strong-acid cation-exchange resin, regenerated in the conventional manner with NaCl, results in both a lower capacity of the resin to remove hardness from the water and in a greater hardness leakage. Thus it will be seen that, with the present invention the optimum combination of complete removal of hardness and high resin capacity is obtained.

EXAMPLE 2

A commercial weak-acid cation-exchange resin bed (Duolite ES–80) is operated as in Example 1 above. In this case however, 17.5 pounds of ammonium carbonate per cubic foot of resin, in the form of a one percent aqueous solution, is used as the converting agent. By this practice the hardness is completely removed from an influent water having a total dissolved solids content of 2,930 p.p.m. and a total hardness of 408 p.p.m., until a throughput of 49 kilograins of hardness per cubic foot of resin is realized, at which time a sharp breakthrough occurs, i.e., the hardness content of the effluent water rises sharply from zero to in excess of 100 p.p.m.

EXAMPLE 3

The practice of Example 2 is repeated with the exception that the weak-acid cation-exchange resin is in this case Amberlite IRC–84 (trademark of the Rohm & Haas Co. for a crosslinked polyacrylate-type resin). This resin shows the ability to completely remove the hardness from an influent water as in Example 2 up to a throughput of 43 kilograins per cubic foot, at which time a sharp breakthrough once again occurs, indicating that the resin has been exhausted.

EXAMPLE 4

A resin bed (Duolite ES–80) is operated as in Example 2 to remove the hardness from an influent water containing 10% by weight NaCl and 2% by weight $CaCl_2$. The hardness is completely removed, without any substantial change in the pH of the water, to a throughput of about 55 kilograins of hardness per cubic foot of resin when eluted with 14 pounds per cubic foot of sulfuric acid (1% solution) and converted with about 16 pounds per cubic foot of $Na_2CO_3$ (4% solution). This test shows that the process of the present invention is completely effective for the removal of hardness from waters which contain no alkalinity without the attendant disadvantage of increasing the acidity of the effluent water.

While the invention has been described in terms of preferred embodiments thereof, it is not to be so limited since changes and alterations may be made therein which are within the full and intended scope of the appended claims.

We claim:

1. A process for the complete removal of hardness from water without substantially affecting the pH thereof which process comprises passing said water through a bed of weak-acid cation-exchange resin, the depth of said bed and the rate of flow of the water therethrough being selected to completely remove the hardness from said water, the predominant portion of the cations of said resin being selected from the group consisting of alkali metal and ammonium cations, said alkali metal and ammonium cations being prepared by converting the resin by contacting it with an aqueous solution of a converting agent selected from the group consisting of alkali metal and ammonium carbonate and bicarbonate 2. A process as in claim 1 wherein the weak-acid cation-exchange resin, upon exhaustion, is regenerated by the steps of;
   (a) eluting the hardness ions from said resin with an excess of an aqueous solution of acid,
   (b) rinsing said resin with water to remove the excess acid,
   (c) converting said resin by contacting it with an aqueous solution of a converting agent in an amount in excess of that theoretically required for complete conversion and selected from the group consisting of alkali metal and ammonium carbonates and bicarbonates and,
   ((d) rinsing said resin with water to remove any excess of converting agent.

3. A process as in claim 2 wherein the acid used to elute the hardness is an aqueous solution containing from 0.1–5 percent by weight of sulfuric acid and is used within the range of from 4–15 pounds of acid per cubic foot of resin.

4. A process as in claim 2 wherein the acid used to elute the hardness is an aqueous solution containing from 1–10 percent by weight of hydrochloric acid and is used in the amount of from 2–10 pounds of acid per cubic foot of resin.

5. A process as in claim 2 wherein the converting agent is an aqueous solution containing from 1–10 percent by weight of sodium carbonate and is used in an amount of from 5–20 pounds of agent per cubic foot of resin.

References Cited

UNITED STATES PATENTS 3,336,747   8/1967   Applebaum et al. _____ 210—38

SAMIH N. ZAHARNA, Primary Examiner

U.S. Cl. X.R.

210—38